(12) United States Patent
McLeod et al.

(10) Patent No.: US 7,138,474 B1
(45) Date of Patent: Nov. 21, 2006

(54) END USE ARTICLES DERIVED FROM POLYPROPYLENE HOMOPOLYMERS AND RANDOM COPOLYMERS

(75) Inventors: Mike McLeod, Kemah, TX (US); David Young, Deer Park, TX (US); Likuo Sun, Houston, TX (US); Vincent Barre, Jacksonville, FL (US); David Turner, Pasadena, TX (US); John Bieser, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/121,340

(22) Filed: May 3, 2005

(51) Int. Cl.
*C08F 110/06* (2006.01)
*C08F 210/06* (2006.01)

(52) U.S. Cl. .................... 526/351; 526/160; 526/170; 526/348; 428/36.3; 428/36.9; 428/36.92; 428/220; 215/400

(58) Field of Classification Search ............. 526/348.1, 526/160, 170, 348, 351; 428/36.9, 220, 36.3, 428/36.92; 215/400
See application file for complete search history.

(56) References Cited

U.S. PATENT DOCUMENTS

| | | | |
|---|---|---|---|
| 5,026,798 A | 6/1991 | Canich | 526/127 |
| 5,272,003 A | 12/1993 | Peacock | 428/357 |
| 5,319,734 A | 6/1994 | Buzzetti | 385/140 |
| 5,643,847 A | 7/1997 | Walzer, Jr. | 502/117 |
| 5,703,187 A | 12/1997 | Timmers | 526/282 |
| 5,747,406 A | 5/1998 | Reichle et al. | 502/117 |
| 5,849,852 A | 12/1998 | Koch et al. | 526/96 |
| 5,859,653 A | 1/1999 | Aoki et al. | 347/8 |
| 5,869,723 A | 2/1999 | Hinokuma et al. | 556/402 |
| 5,908,594 A | 6/1999 | Gownder et al. | 264/210.7 |
| 5,997,679 A | 12/1999 | Wheat et al. | 156/244.11 |
| 6,069,213 A | 5/2000 | Nemzek et al. | 526/113 |
| 6,090,325 A | 7/2000 | Wheat et al. | 264/290.2 |
| 6,180,732 B1 | 1/2001 | Ewen | 526/127 |
| 6,476,172 B1 * | 11/2002 | Wachowicz et al. | 526/348.1 |
| 6,777,366 B1 | 8/2004 | Gauthier et al. | 502/117 |
| 6,777,367 B1 | 8/2004 | Gauthier et al. | 502/117 |
| 6,878,327 B1 * | 4/2005 | Cooper et al. | 264/210.8 |
| 2002/0146560 A1 * | 10/2002 | Gownder et al. | 428/364 |
| 2002/0176974 A1 * | 11/2002 | Hanyu et al. | 428/213 |
| 2004/0171782 A1 * | 9/2004 | Lin et al. | 526/351 |

FOREIGN PATENT DOCUMENTS

| | | |
|---|---|---|
| AU | 717450 | 12/1996 |
| WO | WO98/07515 | 2/1998 |
| WO | WO98/32775 | 7/1998 |

* cited by examiner

*Primary Examiner*—Fred Teskin
(74) *Attorney, Agent, or Firm*—Tenley R. Krueger

(57) ABSTRACT

Articles of manufacture and a method of making the articles are provided. The articles of manufacture comprise CpFlu metallocene catalyzed polypropylene homopolymers and $C_2$–$C_3$ random copolymers having narrow molecular weight distributions and low xylene solubles (or extractables) contents. Because of a number of desirable properties, the polypropylene homopolymers and $C_2$–$C_3$ random copolymers may be used to prepare a wide variety of useful articles, including but not limited to cast films, such as packaging; fibers suitable for use in fabrics and carpet applications, and injection and blow molded items such as bottles.

22 Claims, 5 Drawing Sheets

Draw ratio at which the yarn fails and wraps on the GODET at 1.2 g/hole/min.

Draw ratio at which the yarn fails and wraps on the GODET at 0.6 g/hole/min.

Foy Tenacities at Maximum Strength versus Draw Ratio

- ◆ EOD 02-01j
- ■ EOD 99-21m
- ▲ 3761

Percent Elongation at Maximum Tenacity versus Draw Ratio

- ◆ EOD 02-01j
- ■ EOD 99-21m
- ▲ 3761

Haze Properties

Average Ultimate Seal Strength

Maximum Ultimate Seal Strength

Maximum Ultimate Seal Strength

END USE ARTICLES DERIVED FROM POLYPROPYLENE HOMOPOLYMERS AND RANDOM COPOLYMERS

BACKGROUND OF THE INVENTION

1. Technical Field

This invention relates to the field of polymers and more specifically to the field of articles prepared from polypropylene homopolymers and copolymers.

2. Background of the Art

Homopolymers and copolymers of polypropylene are typically polymerized in continuous polymerization reactors, such as, for example, loop reactors. To produce these polymers one or more monomer streams are generally introduced into the selected reactor and then circulated with an appropriate catalyst. Frequently, conventional Ziegler-Natta catalysts are employed. The resulting polymers may be subjected to appropriate purification and post-processing steps and then made into end products using conventional techniques such as injection molding and extrusion. These end products may be, for example, films, molded articles, and fibers, as well as the woven and non-woven products that may be prepared from the fibers.

Unfortunately, Ziegler-Natta catalyzed polypropylene products often suffer from certain undesirable physical and mechanical properties problems. For example, films may exhibit undesirably poor clarity, which reduces their commercial potential. Molded parts may exhibit reduced smoothness, strength and toughness. Fibers, too, may show less than desirable levels of strength and toughness, which may result in problems during weaving or other steps necessary to prepare end products therefrom. Because of these problems, a need exists for articles of manufacture, prepared from polypropylene materials, in which these problems are reduced or eliminated.

SUMMARY OF THE INVENTION

In one embodiment the invention is an article of manufacture prepared from a CpFlu metallocene catalyzed polypropylene homopolymer having a molecular weight distribution from about 2.3 to about 3.4 polydisperity units and a xylene solubles content from about 0.06 to about 3.2 percent by weight of the polypropylene.

In another embodiment the invention is an article of manufacture prepared from a CpFlu metallocene catalyzed polypropylene $C_2$–$C_3$ random copolymer having a molecular weight distribution from about 2.0 to about 2.5 polydisperity units and a xylene solubles content from about 0.16 to about 1.0 percent by weight of the polypropylene.

In still another embodiment the invention is a method of making an article of manufacture comprising polymerizing propylene in the presence of a CpFlu metallocene catalyst to form a form a polypropylene homopolymer resin having a molecular weight distribution from about 2.3 to about 3.4 polydisperity units and a xylene solubles content from about 0.06 to about 3.2 percent by weight of the polypropylene; and forming the polypropylene homopolymer resin into an article of manufacture.

In yet another embodiment the invention is a method of making an article of manufacture comprising polymerizing propylene and ethylene in the presence of a CpFlu metallocene catalyst to form a polypropylene $C_2$–$C_3$ random copolymer resin having a molecular weight distribution from about 2.0 to about 2.5 polydisperity units, an ethylene content from about 1.8 to about 3.2 percent by weight of the polypropylene $C_2$–$C_3$ random copolymer resin; and a xylene solubles content from about 0.16 to about 1.0 percent by weight of the polypropylene $C_2$–$C_3$ random copolymer resin; and forming the polypropylene $C_2$–$C_3$ random copolymer resin into an article of manufacture.

BRIEF DESCRIPTION OF THE FIGURES

For a detailed understanding and better appreciation of the invention, reference should be made to the following detailed description of the invention taken in conjunction with the accompanying drawings, wherein.

DETAILED DESCRIPTION OF THE INVENTION

Figure 1:
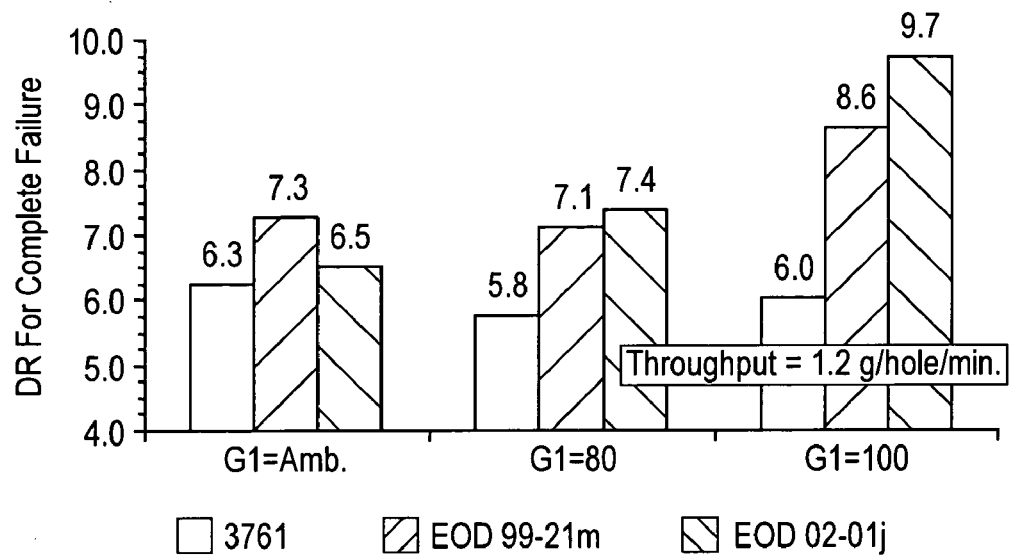
FIG. 1 is a plot of the draw ratio at failure for fibers produced at 1.2 g/hole/minute.
Figure 2:
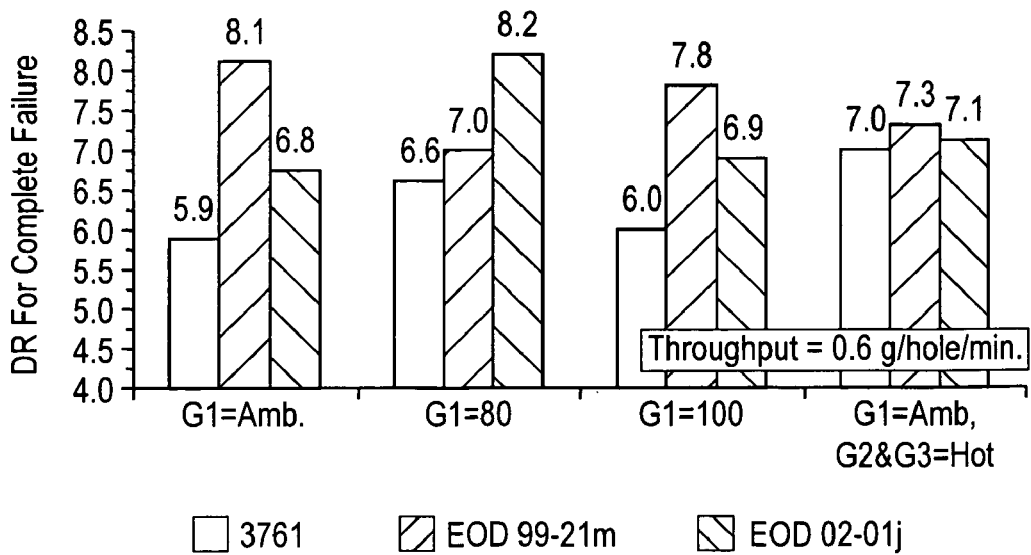
FIG. 2 is a plot of the draw ratio at failure for fibers produced at 0.6 g/hole/minute.
Figure 3:
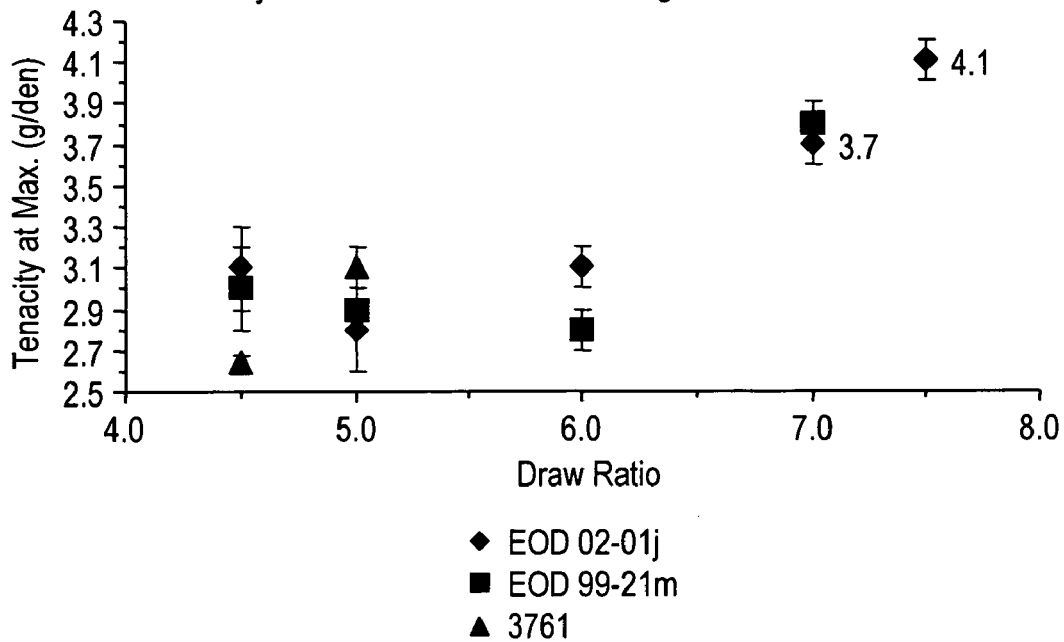
FIG. 3 is a plot of the FOY tenacities for fibers.
Figure 4:
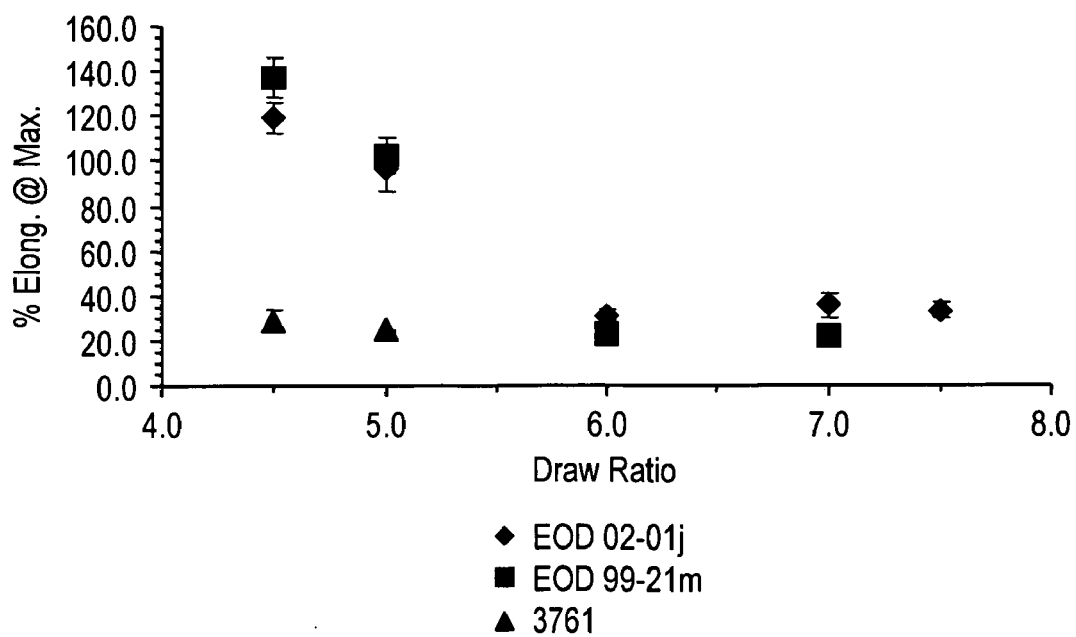
FIG. 4 is a plot of the percent elongation at maximum tenacity for fibers.

Disclosed herein are end use articles of manufacture derived from metallocene catalyzed homopolymers and random copolymers of polypropylene. The end use articles, which may include but are not limited to fibers, films and injection molded articles, are prepared from polymers that exhibit certain relevant properties improvements such as, for example, relatively high clarity, smooth surfaces, low gel content, low xylene solubles (extractables) content, good strength, high fiber tenacity, and low odor. The polymers may also exhibit certain processing improvements such as good spinnability and tenacity. These processing improvements may result in end use articles that are better suited to their ultimate purposes. These polypropylene resins may be homopolymers or random copolymers.

Where the goal is to prepare articles of manufacture from a polypropylene (PP) homopolymer, such resin may be produced as pellets or fluff via the catalyzed polymerization of propylene monomer. In one embodiment a highly isotactic PP homopolymer may be particularly useful. The isotactic PP (iPP) homopolymers useful herein are characterized as "highly isotactic" because they have a degree of isotacticity of at least about 93 percent, desirably at least about 96 percent by weight. Unless noted to the contrary, the term "iPP homopolymer" includes both pure iPP homopolymers and iPP homopolymers containing less than about 1 weight percent of various alpha olefins (including ethylene) by weight of the homopolymer.

The PP homopolymers, including the iPP homopolymers, are formed by placing propylene monomer in a suitable reaction vessel in the presence of a selected metallocene catalyst, under reaction conditions sufficient to result in polymerization of the propylene. Standard polymerization equipment and procedures may be employed. In order to provide isospecific polymerization of the propylene monomer at an activity of at least 1000 grams of polymer per gram of catalyst per hour, the reaction zone is desirably maintained at a temperature of from about 50 to about 70° C.

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes ring fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_7$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

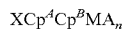

XCp$^A$Cp$^B$MA$_n$ wherein X is a structural bridge, Cp$^A$ and Cp$^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$, $RP=$(wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also includes the CpFlu family of catalysts (e.g., a metallocene incorporating a substituted Cp fluorenyl ligand structure) represented by the following formula:

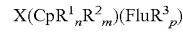

X(CpR$^1_n$R$^2_m$)(FluR$^3_p$)

wherein Cp is a cyclopentadienyl group, Fl is a fluorenyl group, X is a structural bridge between Cp and Fl, R$^1$ is a substituent on the Cp, n is 1 or 2, R$^2$ is a substituent on the Cp at a position which is proximal to the bridge, m is 1 or 2, each R$^3$ is the same or different and is a hydrogen or a hydrocarbyl group having from 1 to 20 carbon atoms with R$^3$ being substituted on a nonproximal position on the fluorenyl group and at least one other R$^3$ being substituted at an opposed nonproximal position on the fluorenyl group and p is 2 or 4.

Another family of the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. No. 6,069,213, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213, which are incorporated by reference herein.

Non-limiting examples of metallocene catalyst components include:
cyclopentadienylzirconiumA$_n$,
indenylzirconiumA$_n$,
(1-methylindenyl)zirconiumA$_n$,
(2-methylindenyl)zirconiumA$_n$,
(1-propylindenyl)zirconiumA$_n$,
(2-propylindenyl)zirconiumA$_n$,
(1-butylindenyl)zirconiumA$_n$,
(2-butylindenyl)zirconiumA$_n$,
methylcyclopentadienylzirconiumA$_n$,
tetrahydroindenylzirconiumA$_n$,
pentamethylcyclopentadienylzirconiumA$_n$,
cyclopentadienylzirconiumA$_n$,
pentamethylcyclopentadienyltitaniumA$_n$,
tetramethylcyclopentyltitaniumA$_n$,
(1,2,4-trimethylcyclopentadienyl)zirconiumA$_n$,
dimethylsilyl(1,2,3,4-tetramethylcyclopentadienyl)(cyclopentadienyl)zirconiumA$_n$, dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecyclcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyi)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$, dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$,
diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titanium$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$,
and derivatives thereof.

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as the aluminoxanes as activators. Aluminoxanes are well known in the art and can be made by conventional methods, such as, for example admixing an aluminum alkyl with water. Nonhydrolytic routes to form these materials are also known Traditionally, the most widely used aluminoxane is methylaluminoxane (MAO), an aluminoxane compound in which the alkyl groups are methyls. Aluminoxanes with higher alkyl groups include hexaisobutylalumoxane (HIBAO) isobutylaluminoxane, ethylaluminoxane, butylaluminoxane, heptylaluminoxane and methylbutylaluminoxane; and combinations thereof. Modified aluminoxanes (e.g., "MMAO"), may olso be used. The use of MAO and other aluminum-based activators in polyolefin polymerizations as activators are well known in the art.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl) ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;

N,N-dialkylanilinium salts such as:
N,N-dimethylaniliniumtetraphenylboron,
N,N-diethylaniliniumtetraphenylboron,
N,N-2,4,6-pentamethylaniliniumtetraphenylboron and the like;

dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenylboron,
tridimethylphenylphosphoniumtetraphenylboron, and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

Other activators include those described in WO 98/07515 such as tris (2,2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in for example, U.S. Pat. Nos. 5,849,852 5,859,653 and 5,869,723; and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (Al from MAO) ranges from 40 to 500 in one embodiment, ranges from 50 to 400 in another embodiment, ranges from 60 to 300 in yet another embodiment, ranges from 70 to 200 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347–1374 (2000).

In one embodiment, the heterocyclic compound described above is combined with an alkyl aluminum scavenger. The alkyl aluminum compounds can remove or mitigate materials such as water and oxygen that could otherwise interfere with the metallocene catalysts. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof. While most often used as scavengers, the compounds can also, in some applications, function as cocatalysts or activators also. One of ordinary skilled in the art of performing metallocene catalyzed polyolefin polymerizations will be versed in selecting and employing such scavengers.

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2/g$ to 1,000 $m^2/g$, or from 100 $m^2/g$ to 400 $m^2/g$, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment of the process, MAO is first reacted with silica and then a metallocene is added to prepare a catalyst. Other methods and order of addition will be apparent to those skilled in the art. Such processes are known in the art and disclosed in, for example, U.S. Pat. Nos. 6,777,366 and 6,777,367, both to Gauthier, et al., and incorporated herein by reference.

To prepare a copolymer it is necessary, in general, to contact the mixture of monomers and the given catalyst. In most cases it is desirable that the catalyst has been preactivated. Those skilled in the art will understand that this refers to subjecting the metallocene catalyst to conditions that promote the desired interaction between the activator or co-catalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is incorporated herein by reference.

Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

A variety of metallocene catalysts may be selected to catalyze the polymerization of the polymers useful with this invention. One group that may be useful is the isospecific substituted CpFlu metallocene catalyst group. In one embodiment, the metallocene catalyst used incorporates a substituted cyclopentadienyl fluorenyl ligand structure and is characterized by the formula $$X(CpR1_{n1}R2_m)(FluR3_{n2}) \tag{1}$$

wherein Cp is a cyclopentadienyl group; Fl is a fluorenyl group; X is a structural bridge between Cp and Fl imparting stereorigidity to the metallocene; R1 is a substituent on the cyclopentadienyl group; n1 is 1 or 2; R2 is a substituent on the cyclopentadienyl group at a position which is proximal to the bridge; m is 1 or 2; each R3 is the same or different and is a hydrocarbyl group having from 1 to 20 carbon atoms with R3 being substituted on a nonproximal position on the fluorenyl group and at least one other R3 being substituted at an opposed nonproximal position on the fluorenyl group; and n2 is 2 or 4.

Where the catalyst is supported, the support is desirably silica having an average particle size from about 10 to about 50 microns and a surface area from about 200 to about 800 $m^2/g$ and more desirably from about 300 to about 800 $m^2/g$. The support desirably has a pore volume from about 0.9 to about 2.1 milliliters per gram (ml/g). The metallocene component is supported on the silica support in an amount of at least about 1 weight percent of the combined amount of the silica and the alumoxane. Desirably, the metallocene component is present on the silica support in an amount of at least about 1.5 weight percent. The alumoxane cocatalyst component is incorporated onto the silica support to provide a weight ratio of alumoxane to silica of at least about 0.8:1 and desirably at least about 1:1.

It is frequently desirable to mix or otherwise combine certain additives with the PP homopolymer, prior to forming an end use article. Selected additives may be suited to the particular needs or desires of a user or maker, and various combinations of the additives may be used. Because the PP homopolymers are typically produced in the form of pellets or fluff, it is frequently convenient to simply dry blend (for example, via tumble blending) the additives with the pellets or fluff. Examples of apparatuses suitable for blending the PP homopolymer base material with an additive include the Henschel™ blender, the Banbury™ mixer, and any other relatively low shear blending equipment of the type that typically accompanies a commercial blow molding or sheet extrusion line. Combinations of such equipment may also be effectively used.

Additives that are commonly employed are often combined into commercial additive packages. These packages may include stabilizers, which help to inhibit oxidation or thermal or ultraviolet light degradation of the end use article. Examples of suitable thermal stabilizers include, but are not limited to, pentaerythritol tetrakis; tris(2,4-di-tert-butylphenyl)phosphite; 1,3,5-trimethyl-2,4,6-tris(3,5-di-tert-buytl-4-hydroxybenzyl)-benzene; octadecyl-3,5-di-tert-butyl-4-hydroxyhydrocinnamate; synthetic hydrotalcite; and combinations thereof. Also frequently employed in such packages are melt stabilizers (also called secondary stabilizers), which help to prevent degradation during melt processing. The melt stabilizers may be selected from a variety of commercially available phosphate inhibitors and die lubricants, including, for example, metal stearates, fluoropolymers, and their combinations.

The amount of additives introduced to the iPP homopolymer may be from about 0.0 percent to about 4.0 percent by weight of the homopolymer. Desirably the amount is from about 0.05 to about 3.0 percent by weight, more desirably from about 0.1 to 2.0 percent by weight.

In general the physical properties of the PP homopolymers used in the inventive PP-derived articles of manufacture are improved. These physical properties include, but are not necessarily limited to, the polymer's bulk density (BD), melt flow rate, melting point temperature ($T_m$), molecular weight, molecular weight distribution, percent of xylene solubles (or extractables), and isotactic index reported in meso pentads. Processing improvements may also be seen, including a relatively high level of activity of the metallocene catalyst and reduced levels of fouling occurring during the polymerization. These processing improvements alone illustrate some of the value of this invention, since the claimed articles of manufacture may therefore be more easily manufactured.

For example, catalyst activity is a measure of the grams of polymer produced per hour per gram of transition metal. The activity of some effective metallocene catalysts useful to prepare the homopolymers described herein may range from about 3500 to about 6500 g/g/h, at a reaction temperature from about 50 to about 70° C. Fouling is a measure of polymer buildup during the polymerization procedure. It may be measured using a standardized technique from one polymerization run to another and is reported in milligrams of polymer buildup per gram of polymer produced. The fouling level of the described metallocene catalyzed polymerization may range from about 5 to about 25 mg/g.

Another important property is the PP homopolymer's melt flow rate (MFR). This property may be determined using ASTM D1238, including both procedure A (manual operation) and procedure B (automatically timed flow). The MFR is inversely proportional to the average length of a polymer chain. Thus, a higher MFR value is reflective of a relatively short average polymer chain length. The MFR for the PP homopolymers may range from about 0.4 to about 100 g/10 min, desirably about 0.7 to about 30 g/10 min, using a 2.16 kg load at 230° C.

One particular advantage offered by the polymers used to prepare the articles of manufacture is their relatively low xylene solubles content. Xylene solubles content is that proportion of the final polymer that is soluble in xylene. Low xylene solubles contents are desirable because xylene solubles in general tend to result in the appearance of migration residue on the surface of an end use article. The xylene soluble fraction is defined as the ratio of the soluble weight fraction to the initial weight sample. The xylene solubles content is determined by dissolving the PP homopolymers in boiling xylene and allowing them to crystallize at room temperature for 30 minutes, followed by quenching for 10 minutes in an ice bath. The PP homopolymer solids may then be filtered, flashed and dried in a vacuum oven at 70° C. for 1 hour. The amount of xylene solubles present in the PP homopolymers may range from about 0.06 to about 3.2 percent by weight of the homopolymer.

One advantage of the invention is that the desired physical properties of the articles of manufacture may be easily customized. This is because the PP homopolymers may exhibit a relatively narrow molecular weight distribution (MWD). MWD may be determined using, for example, ASTM D3593, which involves gel permeation chromatography (GPC) using a Waters HT6E column at 135° C. with 1,2,4-trichlorobenzene as the elution solvent and butylated hydroxytoluene (BHT) as the stabilizer. Alternatively, three columns may be employed in a series, with two Shodox AT-806 columns and one Waters HT6E column with a refractive index detector. The molecular weight of the PP homopolymer may then be calculated using conventional broad standard calibration, and the weight average molecular weight (Mw) may range from about $151 \times 10^3$ to about $594 \times 10^3$. The number average molecular weight (Mn) may range from about $71 \times 10^3$ to about $75 \times 10^3$, and the z average molecular weight (Mz) may range from about $313 \times 10^3$ to about $335 \times 10^3$. The molecular weight distribution may be calculated as MWD=Mw/Mn, and may range from about 2.3 to about 3.4 polydisperity units.

Additional properties improvements may be seen in the PP homopolymers' melting point temperatures ($T_m$). In general these melting point temperatures may range from about 140 to about 150° C., which is a desirable range for commercial production of a wide variety of types of articles. $T_m$ may be determined by, for example, differential scanning calorimetry using a Perkin-Elmer Series 7 (power compensating unit) Differential Scanning Calorimeter (DSC). This instrument may be calibrated using indium and tin standards. The DSC first heats the homopolymer to 210° C. at a rate of 10° C./minute and then maintains it at 210° C. for 5 minutes to eliminate thermal history. The DSC then cools the homopolymers to 50° C. at 10° C./minute, holds it at 50° C. for 1 minute, and then ramps it to 190° C. at 10° C./minute. The $T_m$ for the homopolymers is taken from the second heat thermogram readout.

Standard techniques, such as injection molding, compression molding, and sheet extrusion, may be used to form the inventive PP homopolymers into end use articles. For example, PP homopolymer cast films may be formed by cast film production techniques known to those of ordinary skill in the art. In cast film production, PP homopolymers are melted and passed through an extruder and then through a slot die mechanism and over a chill roller that solidifies the film.

Optical properties may also be enhanced for films. This is in large part due to the relatively narrow molecular weight distribution of the polymers, which in films tends to reduce haze while enhancing gloss. The haze of the films may be determined using, for example, ASTM D1003, which measures the amount of light scattering as it passes through a transparent material. To determine this, a test specimen, typically a 2 mil or 100 micrometer disk is placed inside a spectrophotometer which then takes automated measurements of the haze. Haze measurements are typically given as percentages, with haze values of less than about 0.5 percent after aging of at least 30 days exhibited by some embodiments. Gloss may be determined using ASTM D-523 and is the ratio of the amount of light reflected from a material to the amount of light scattered, at a specific angle of incidence, multiplied by 100 percent. The PP homopolymer films desirably have, for a 2 mil thickness, a 45° gloss values greater than about 90 percent, i.e., most of the light is reflected.

The tensile strength of the PP homopolymer films may be determined using ASTM D-638, which measures the rupture strength (stress-strain product at break) per unit area of a material subjected to a specific dynamic load. The films desirably exhibit a tensile strength from about 4200 to about 4400 psi.

Another important property improvement relates to the films' heat seal properties. This property may be measured using, for example, a Theller Model HT Heatsealer testing device that simulates commercial sealing apparati and then determines the characterstics of the heat seals formed. The obtained heat seal curves indicate the seal strength of two films bonded at a series of temperatures. Because heat seal curves shift to lower temperatures for lower melting resins, interpolations from this data provide seal initiation temperature (SIT) values. As temperature increases, the bond between two films will become sufficiently strong that the test then becomes a tensile test. The average ultimate heat seal strength of the PP homopolymer films may range from about 0.2 to about 2.4 N/cm over a temperature range from about 105 to about 125° C. The maximum ultimate heat seal strength of the PP homopolymer films may range from about 0.2 to about 3.3 N/cm under temperature conditions ranging from about 100 to about 125° C. In addition, the average SIT at an average ultimate heat seal strength of 0.77 N/cm for the PP homopolymers, corresponding to an ethylene ($C_2$) weight percent ranging from about 0.5 to about 3 weight percent $C_2$ by weight of the homopolymer, may be from about 99 to about 115° C.

Hot tack is another important property improved in the invention. It is the strength of a hot seal measured at a specified time interval after completion of the sealing cycle but prior to the seal reaching ambient temperature. A seal temperature that is too cold results in a weak seal, as does a seal temperature that is too hot. Hot tack curves should ideally be bell-shaped, indicating the maximum hot seal strength possible and the processing window for obtaining acceptably high seal strength values. For the PP homopolymer films, the hot tack curves shift to lower temperatures as the ethylene concentration increases. The hot tack at 500 ms values may range from about 0.25 to about 0.90 N/cm over a temperature range of from about 105 to about 123° C.

Desirable end use articles made from iPP homopolymers include biaxially-oriented PP (BOPP) films. BOPP films are formed using any suitable oriented film production technique, such as those disclosed in U.S. Pat. No. 5,997,679 and Canadian patent No. 2,178,104, the disclosures of which are incorporated herein by reference. BOPP films typically having a thickness of from about 10 to about 100 micrometers and may be produced by casting a molten PP homopolymer blend over machine rollers. [Note: I changed the thickness from 90 to 10 micrometers because many commercial films are in the 15 to 35 micrometer thickness range.]

The end use article may be prepared using a cast film process. In such an embodiment, a molten PP homopolymer exits the extruder at 495° F. (257° C.) and is cast over machine rollers maintained at a temperature of 60° F. (15.5° C.), the overall line speed being about 100 fpm. Other methods may also be employed, and thinner films may also be prepared for a wide variety of uses. Such uses may include pages for photograph albums and packagings, such as shrink wrapping, food wraps, and food bags, for example, potato chip bags.

The previously described PP homopolymers may also be formed into fibers using any suitable melt spinning procedure, such as the conventionally known Foume fiber spinning procedure. Examples of processes for making PP fibers are also provided in U.S. Pat. Nos. 5,908,594, 5,272,003, and 5,318,734, the disclosures of which are incorporated herein by reference. In particular, the use of certain metallocene catalysts, and particularly isospecific catalysts, may result in iPP homopolymer structures that may be correlated with desirable fiber characteristics, including strength and toughness. When a semicrystalline polymer is drawn into a highly oriented state, its tenacity and modulus increase, while its elongation to break decreases. Either syndiotactic PP or stereoregular iPP may be employed.

The iPP homopolymers may exhibit a relatively high spinnability of from about 2,000 to about 5,000 m/min. The tenacity of partially oriented yarn (POY) made from the iPP homopolymers tends to be relatively high, making the iPP homopolymers highly marketable in the melt blown fiber industry. This POY tenacity is desirably greater than about 3 g/denier. Further, the iPP homopolymers may be processed into fibers at a relatively low temperature from about 170 to about 200° C., making it possible to use less expensive pigments in manufacturing the fibers. The fibers may include those used for carpet pile, carpet backings, and fabrics that are useful for preparing clothing including, for example, thermal wear.

The PP homopolymers may also be formed into molded articles using any suitable injection molding techniques known to those of ordinary skill in the art. The tensile modulus of such molded articles may range from about 1.20 to about 1.47 E+05 psi and from about 827 to about 1013 MPa. The tensile strength at yield for the iPP homopolymer molded articles may range from about 3200 to about 3660 psi and from about 22 to about 25 MPa, and the tensile strength at break may desirably range from about 2310 to about 2490 psi and from about 16 to about 17 MPa. Values for elongation at yield for the iPP homopolymer molded articles may range from about 12.3 to about 12.5 percent, and the elongation at break may range from about greater than about 351 to less than about 358 percent. These properties are particularly desirable for preparing articles such as bottles for fruit juices and the like.

While polypropylene homopolymers may exhibit a wide variety of desirable processing and properties improvements, the articles of manufacture described herein may also be prepared from polypropylene random copolymers. Such are desirably $C_2$–$C_3$ random copolymers. These $C_2$–$C_3$ random copolymers are formed by the catalyzed polymerization of a mixture of ethylene ($C_2$) and propylene ($C_3$) monomers. Catalysts useful for preparing these random copolymers are selected from metallocene catalysts that may also be useful for preparing the homopolymers described hereinabove. These $C_2$–$C_3$ random copolymers may be propylene based, meaning that they desirably have a greater weight percentage of propylene than ethylene. In one embodiment the $C_2$–$C_3$ random copolymer may have about 2 weight percent ethylene by weight of the copolymer.

One desirable polymer configuration for these random copolymers is the isotactic configuration, with minimal presence of syndiotactic or atactic polymer. Such isotactic $C_2$–$C_3$ random copolymers are essentially insoluble in xylene, or have a minimal xylene solubles content, and exhibit a high degree of crystallinity, desirably from about 13 to about 37 percent by weight. In an isotactic polymer configuration $C_2$–$C_3$ random copolymers have a degree of isotacticity that is desirably at least about 75 percent, more desirably at least about 93 percent, and most desirably at least about 96 percent. Examples of stereospecific polymer configurations and propagation thereof may be found in U.S. Pat. No. 6,090,325, the disclosure of which is incorporated herein by reference.

One or more modifiers such as TATMER XR 110T, and alpha-olefin copolymer, may be blended with the $C_2$–$C_3$ random copolymer base material. The amount of modifier combined with the copolymer is desirably in the range of from about 5 to about 40 weight percent based on the total weight of the blend, more desirably from about 6 to about 20 weight percent, and most desirably about 15 weight percent.

The random copolymers useful herein are made by polymerizing propylene and ethylene in the amounts desired in a suitable reaction vessel in the presence of a suitable metallocene catalyst and under suitable reaction conditions for the polymerization. Standard equipment and procedures as are well known in the art may be used to carry out the polymerization. The ethylene feed rate may range from about 180 to about 200 lbs/hr based on a 10,000 lbs/hr. propylene feed rate. In one embodiment the $C_2$–$C_3$ random copolymer comprises about 2 weight percent ethylene, by weight of the copolymer. The resin may have the following properties: A bulk density (BD) ranging from about 0.34 to about 0.45 g/cc; a weight average molecular weight ($M_w \times$ 1000) ranging from about 95 to about 255; a MFR ranging from about 0.4 to about 90 g/10 min with a 2.16 kg load at 230° C.; a xylene solubles content ranging from about 0.16 to about 0.5 weight percent by weight of the copolymer; and an MWD ranging from about 2.0 to about 2.5 polydisperity units. This relatively low xylene solubles content indicates that the end use articles formed therefrom experience little or no migration to their surfaces.

The random copolymers may be used in the manufacture of the inventive end use articles, including but not limited to fibers and injection molded articles, via extrusion, injection molding, thermoforming, and other polymer fabrication techniques known to those skilled in the art. Blends of the $C_2$–$C_3$ random copolymers, along with modifiers, may be used as a single layer or as a component in multiple layer configurations. Further, the relatively low melting points that may be obtained for these copolymers result in improvements in physical properties.

Conventional cast film production techniques may be employed. In general, the $C_2$–$C_3$ random copolymers are melted and passed through an extruder and subsequently passed through a die slot mechanism, after which the material is passed over a chill roller, solidifying the film. Because these films may be used as skin layers, their optics properties, including reduced glaze and enhanced gloss, may be particularly important. The relatively narrow MWD of the random copolymers improves these properties, which makes these resins particularly useful for preparing, for example, food bags, such as potato chip bags, and bags for medical uses To test optical performance, films are typically first aged at ambient temperature for a period of 30 days. Test films, which are generally cast films having a thickness of about 50 micrometers, may exhibit haze values from about 0.2 to about 0.3 percent, and 450 gloss values ranging from about 95 to about 98 percent. Maximum tensile strength values may range from about 5500 to about 6900 psi, and the maximum percent elongation may range from about 730 to about 850 percent.

Another end use product is so-called heat seal films. The polypropylene copolymers may exhibit relatively low melting points ($T_m$ in a range from about 116.3 to about 131.4° C.) and relatively low levels of ethylene (from about 1.8 to about 3.2 weight percent ethylene by weight of the copolymer). The average seal initiation temperature at 0.77 N/cm ranges from about 100 to about 119° C. over a $T_m$ range from about 115 to about 140° C. Hot tack at 500 ms may range from about 0.25 to about 0.90 N/cm over a temperature range from about 105 to about 123° C. These properties are highly desirable in the heat seal film industry, including, for example, adhesive layers in food packaging such as potato chip bags.

In addition, the modulus of these films appears to be a close function of ethylene incorporation. In particular, increased amounts of ethylene create a more amorphous polymer, i.e., it has reduced crystallinity. A lower practical limit on the modulus may be about 20 kpsi (138 mPa), with the films of the invention potentially having a modulus of at least about 50 kpsi (345 mPa).

Fibers may also be formed from these random copolymers, and particularly from the desirably isotactic $C_2$–$C_3$ random copolymers. To accomplish this the random copolymers may be subjected to any suitable melt spinning procedure, such as the Foume fiber spinning procedure previously mentioned. Use of these $C_2$–$C_3$ random copolymers may result in relatively high spinnability. In general spinnability may range from about 2,000 to about 5,000 m/min, and tenacity may range from about 3 to about 4 Crimp may also be improved, and a relatively low $T_m$ may be observed on fiber spinning equipment.

Injection molded end use articles made from the inventive random copolymers may exhibit relatively high heat diffraction temperatures and improved rigidity at elevated temperatures. Such injection molded end use articles may also be less stiff than injection molded articles made of iPP homopolymers. The tensile modulus at yield for such injection molded articles may range from about 480 to about 669 MPa. Further, the tensile strength at yield for such articles may range from about 2300 to about 2790 psi.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES

Example 1

Highly Drawn Fibers

Three polymers are used to prepare fully oriented yarn (FOY) and then tested for certain physical properties.

The first polymer has the designation 3671 and is a conventional Ziegler-Natta catalyzed polypropylene homopolymer and is a comparative example. The second polymer is also a polypropylene homopolymer and has the designation EOD 99-21m and is prepared using a bis-dienyl catalyst, C1, and is also a comparative example. It has a xylenes soluble content of about 0.5 percent and a polydispersity of about 3.4. The third polymer is a polypropylene copolymer having less than 0.5 percent ethylene and has the designation EOD 02-01j. It is prepared using a CpFlu catalyst, C2. EOD 02-01j has a xylene solubles level of about 0.06 percent and a polydispersity of about 2.35.

The melt spinning and drawing operations are carried out using a Fourne melt spinning line with an extruder profile of 200/210/220/230/230° C. Quench conditions are 1.0 mbar at 10° C. (50° F.). Dual circular spinnerets having 2×27 holes, 0.6 mm diameter were used. Spinning was performed at a melt temperature of 230° C. Final winder speed is held at about 750 m/min. Draw down is controlled using the second godet set which is run at about 1000 m/min A series of pairs of Godet fiber spinner is used at two throughputs, 1.2 g/hole/minute and 0.6 g/hole/minute to produce filament deniers of 13 and 6.5 respectively. The fibers are made using the range of godet temperatures displayed in Table 1. The 1.2 g/hole/minute yarns were made at the faster (750 m/min) winder speed.

EOD 02-01j showed generally superior FOY drawability at higher processing temperatures and throughputs. The results of the draw testing are show in FIGS. 1–4. The exemplary yarn had modulus values matching or exceeding that of the comparative examples.

TABLE 1

Godet Temperature Settings
G1 = first godet pair, G2 = second godet pair, G3 = third godet pair.

| G1 (° C.) | G2 (° C.) | G3 (° C.) |
| --- | --- | --- |
| Ambient | Ambient | Ambient |
| 80 | 85 | 90 |
| 100 | 105 | 110 |
| Ambient | 105 | 110 |

Example 2

Polymer Films

Cast films of the resins used in Example 1 are made using an Egan cast film line (Model # $F_{007403}$). The extrusion system is run with the zone temperatures listed in Table 2 below. The extruder has a L/D ratio of 32:1, with the screw being 3½" in diameter. It is equipped with a 200 mesh screen pack. A Johnson 24" Spartan Flex Lip die is attached to the end of the extruder piping. It has a back center feed entrance with a coat hanger-type die manifold and hard chrome plated flow surfaces. Die gap is s held at 20 mils. The exiting melt is cast onto polished chrome-plated cast and chill rolls. The distance between the die exit and cast roll surface is <1 cm. Roll temperatures were maintained at 60° F. (15° C.) through a chilled water circulation unit. The melt was pinned to the roll surface using an air knife. Line speed was maintained at 100 ft/min (30.5 m/min).

Figure 5:
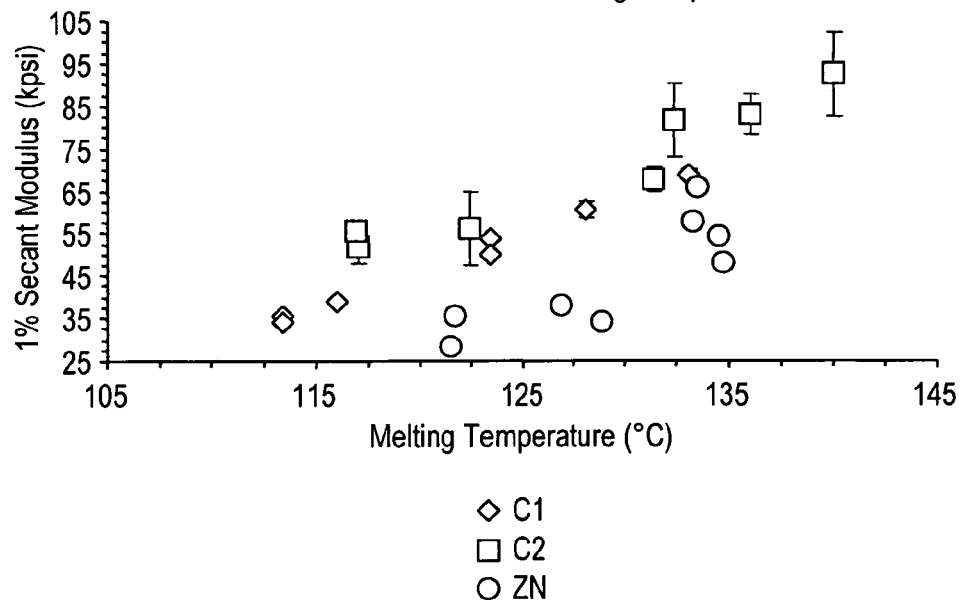
FIG. 5 is a plot of the secant modulus for films.
Figure 6:
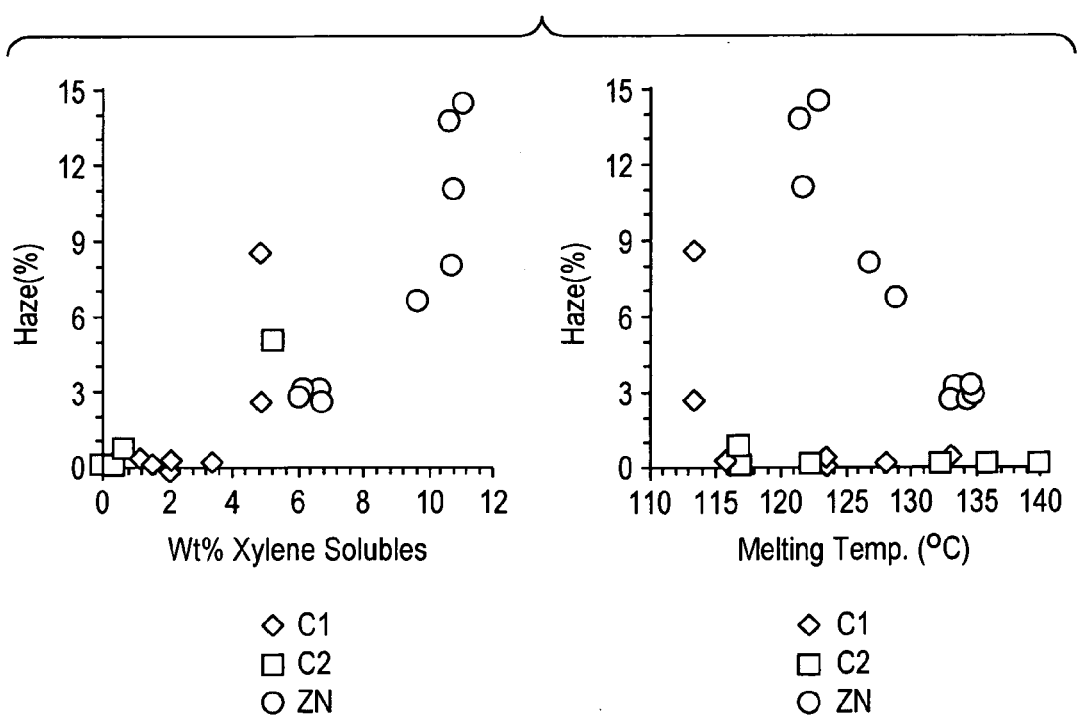
FIG. 6 is a plot of the haze properties for films including ZN produced films.
Figure 7:
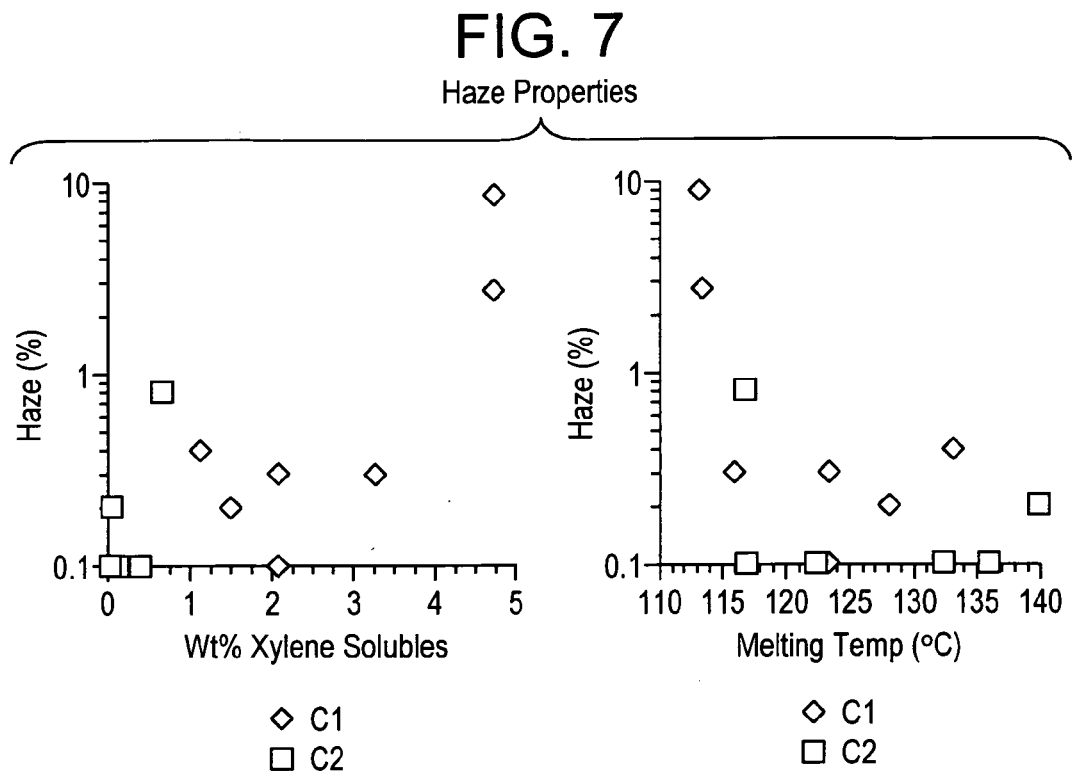
FIG. 7 is a plot of the haze properties of films excluding ZN produced films.

The 2 mil (0.05 mm) films are tested for haze, secant modulus as a function of metlign temperature and xylene solubles content. Haze is measured with a Gardner-Neotec Model XL-211 Hazemeter, following ASTM D1003 procedure "A". All haze measurements are total haze. No attempt was made to separate surface and bulk effects. The results are reported in FIGS. 5, 6, and 7.

TABLE 2

Extruder zone temperatures.

| | |
| --- | --- |
| Barrel #1 Temp. (° F.) | 370 |
| Barrel #2 Temp. (° F.) | 415 |
| Barrel #3 Temp. (° F.) | 435 |
| Barrel #4 Temp. (° F.) | 455 |
| Barrel #5 Temp. (° F.) | 465 |
| Barrel #6 Temp. (° F.) | 465 |
| Barrel #7 Temp. (° F.) | 465 |
| Screen Changer Temp. (° F.) | 475 |
| Pipe #1 Temp. (° F.) | 470 |
| Pipe #2 Temp. (° F.) | 470 |
| Adapter Temp. (° F.) | 470 |
| Die #1 Temp. (° F.) | 495 |
| Die. #2 Temp. (° F.) | 495 |
| Die #3 Temp. (° F.) | 495 |

Example 3

Heat Seal Properties

Figure 8:
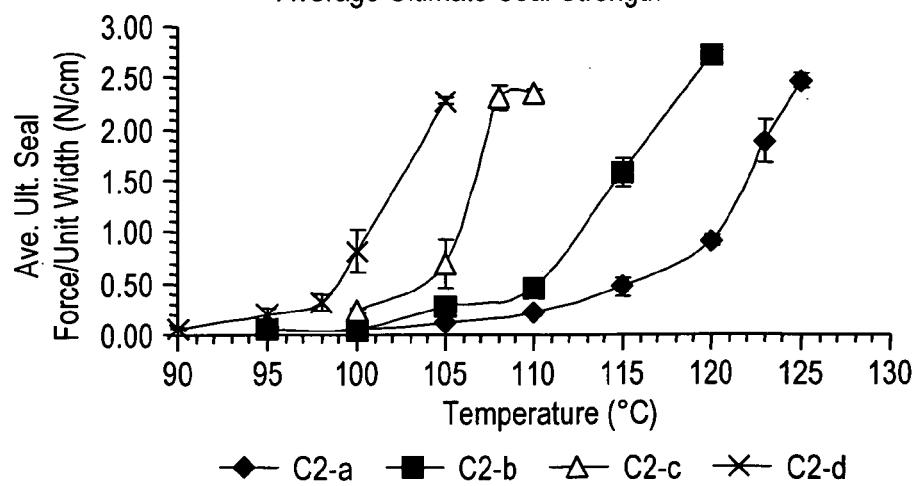
FIG. 8 is a plot of average ultimate seal strengths.
Figure 9:
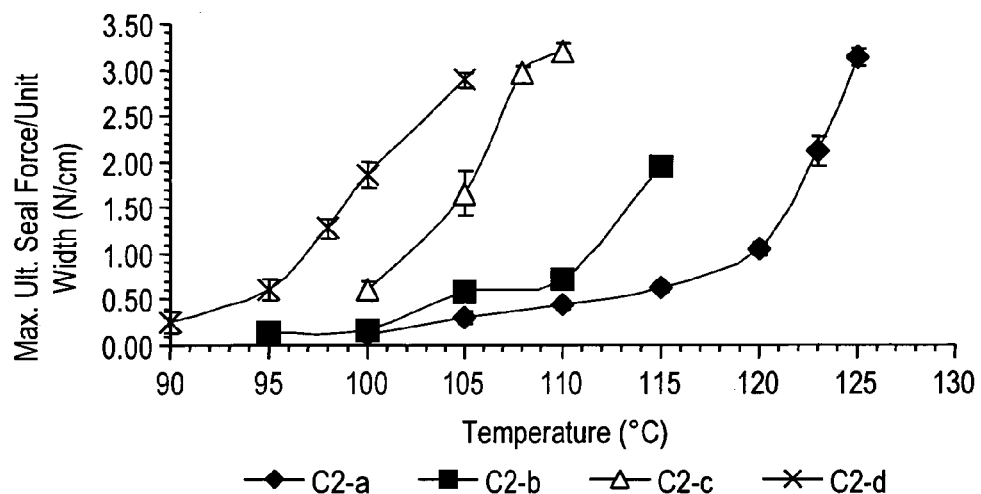
FIG. 9 is a plot of maximum ultimate seal strengths.
Figure 10:
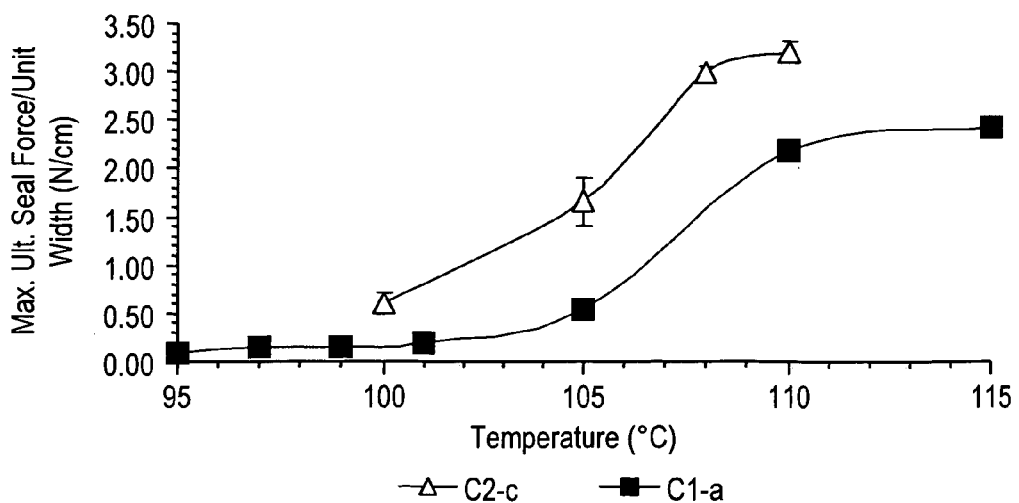
FIG. 10 a plot of maximum ultimate seal strengths including those for a comparison resin.

Films are prepared as in Example 2 using two comparative resins prepared using catalyst C1 and four example resins prepared using catalyst C2 having the properties shown in Table 3. The maximum seal strength and average seal strength in newtons per centimeter is plotted on the ordinate versus the seal temperature T in degrees Centigrade on the abscissa for the polymer shown in Table 3. The results from the testing are displayed in FIGS. 8–10.

TABLE 3

Properties of some random copolymers

| Mat'l | Melt Flow Rate (dg/min) | Xylene Solubles (wt %) | Melting Point (° C.) | Ethylene (wt %) | Poly dispersity |
| --- | --- | --- | --- | --- | --- |
| C1-a | 7.2 | 2.07 | 122.7 | 4.7 | 2.90 |
| C1-b | 7.7 | 4.73 | 112.2 | 6.5 | 3.13 |
| C2-a | 18.0 | 0.06 | 140.8 | 0.7 | 2.35 |
| C2-b | 19.0 | 0.05 | 131.4 | 1.8 | 2.44 |
| C2-c | 13.7 | 0.15 | 120.9 | 2.7 | 2.20 |
| C2-d | 10.5 | 0.38 | 116.3 | 3.2 | 2.18 |

Discussion of the Examples.

The Examples illustrate the superior haze and tensile properties of the films and fibers prepared using the subject CpFlu catalyzed polypropylene homopolymers and copolymers. The good heat seal properties of the resins is also illustrated and contrasted to other otherwise similar resins.

What is claimed is:

1. An article of manufacture prepared from a CpFlu metallocene catalyzed polypropylene homopolymer having a molecular weight distribution from about 2.3 to about 3.4 polydisperity units and a xylene solubles content from about 0.06 to about 3.2 percent by weight of the polypropylene, wherein the article of manufacture is an injection molded article.

2. The article of manufacture of claim 1 wherein the polypropylene homopolymer is at least about 93 percent isotactic.

3. The article of manufacture of claim 1 wherein the polypropylene homopolymer has a melting point from about 140 to about 150° C.

4. The article of manufacture of claim 1 having a tensile modulus from about 827 to about 1013 MPa.

5. The article of manufacture of claim 1 having a tensile strength at yield from about 22 to about 25 MPa and a tensile strength at break from about 16 to about 17 MPa.

6. The article of manufacture of claim 1 being a bottle.

7. An article of manufacture prepared from a CpFlu metallocene catalyzed polypropylene $C_2$–$C_3$ random copolymer having a molecular weight distribution from about 2.0 to about 2.5 polydisperity units and a xylene solubles content from about 0.16 to about 1.0 percent by weight of the polypropylene.

8. The article of manufacture of claim 7 wherein the polypropylene random $C_2$–$C_3$ copolymer is at least about 75 percent isotactic.

9. The article of manufacture of claim 7 wherein the polypropylene random $C_2$–$C_3$ copolymer has a melting point from about 116.3 to about 131.4° C. when the ethylene level in the copolymer is from about 1.8 to about 32 percent by weight of the copolymer.

10. The article of manufacture of claim 7 being a film.

11. The article of manufacture of claim 10 wherein the polypropylene $C_2$–$C_3$ random copolymer has an average seal initiation temperature from about 100 to about 119° C. over a melting point range of from about 115 to about 140° C. and an average ultimate heat seal strength of from about 0.75 to about 0.80 N/cm.

12. The article of manufacture of claim 10 wherein the polypropylene $C_2$–$C_3$ random copolymer has a hot tack at 500 milliseconds from about 0.25 to about 0.90 N/cm over a temperature from about 105 to about 123° C.

13. The article of manufacture of claim 10 wherein the film, at a thickness of 2 ml, has a 45° gloss from about 95 to about 98 percent and a haze from about 0.233 to about 0.317 percent after aging for at least 30 days.

14. The article of manufacture of claim 10 wherein the film is used in or as packaging.

15. The article of manufacture of claim 7 being an injection molded article.

16. The article of manufacture of claim 15 wherein the polypropylene $C_2$–$C_3$ random copolymer has a tensile modulus of from about 480 to about 669 MPa.

17. The article of manufacture of claim 15 wherein the polypropylene $C_2$–$C_3$ random copolymer has a tensile strength at yield of from about 2300 to about 2790 MPa.

18. The article of manufacture of claim 7 being a fiber.

19. The article of manufacture of claim 18 wherein the polypropylene $C_2$–$C_3$ random copolymer has a spinnability of from about 2,000 to about 5,000 m/min.

20. The article of manufacture of claim 18 wherein the polypropylene $C_2$–$C_3$ random copolymer has a tenacity of $\geq 3.0$ g/denier.

21. A method of making an article of manufacture comprising:

polymerizing propylene in the presence of a CpFlu metallocene catalyst to form a polypropylene homopolymer resin having a molecular weight distribution from about 2.3 to about 3.4 polydisperity units and a xylene solubles content from about 0.06 to about 3.2 percent by weight of the polypropylene; and forming the polypropylene homopolymer resin into an article of manufacture.

22. A method of making an article of manufacture comprising:

polymerizing propylene and ethylene in the presence of a CpFlu metallocene catalyst to form a polypropylene $C_2$–$C_3$ random copolymer resin having a molecular weight distribution from about 2.0 to about 2.5 polydisperity units, an ethylene content from about 1.8 to about 3.2 percent by weight of the polypropylene $C_2$–$C_3$ random copolymer resin; and a xylene solubles content from about 0.16 to about 1.0 percent by weight of the polypropylene $C_2$–$C_3$ random copolymer resin; and forming the polypropylene $C_2$–$C_3$ random copolymer resin into an article of manufacture.

* * * * *